Sept. 13, 1960 R. R. PAXTON ET AL 2,952,383
CARBON RUPTURE DISK
Filed Sept. 4, 1959

INVENTORS
Ralph Robert Paxton
William R. Shobert
Richard C. Hackerl
BY McCoy, Greene & Ja Grotenhuis
ATTORNEYS

United States Patent Office 2,952,383
Patented Sept. 13, 1960

2,952,383

CARBON RUPTURE DISK

Ralph Robert Paxton, William R. Shobert, and Richard C. Hacherl, St. Marys, Pa., assignors to Pure Carbon Company, Inc., Elk, Pa., a corporation of Pennsylvania Filed Sept. 4, 1959, Ser. No. 838,299

3 Claims. (Cl. 220—89)

This invention relates to rupture disks which burst when subjected to a predetermined fluid pressure and which serve to relieve excessive fluid pressure in a tank, receptacle or conduit in which fluid pressure may develop.

Such rupture disks are extensively used in connection with chemical processing equipment, either as the sole pressure relieving means or in combination with a pressure relief valve.

In some instances the rupture disk and relief valve are both subjected to the fluid pressure to be controlled and the relief valve is set to operate at a pressure below the burst disk pressure, in which case the burst disk serves only as a safety device, effective only when the relief valve fails to function.

In cases where the contents of the tank are valuable or toxic, or would have a corrosive effect on the relief valve, the rupture disk may be placed between the relief valve and the interior of the tank so that escape of fluid through the relief valve occurs only after the disk has burst.

Frangible disks formed of baked carbon or carbon graphite impregnated at their surfaces or throughout with a resinous or plastic filler that plugs the pores and renders the disk impervious to gases have been found to be highly efficient for the reason that such disks are resistant to high temperatures and to chemical action, have no creep due to repeated flexures, and will fail at the desired predetermined pressure regardless of temperature, previous loads short of the rupture point, or the length of time during which such loads have been applied.

Carbon rupture disks have heretofore been employed which were composed of a flat carbon disk reinforced on one or both faces with a ring of carbon graphite cemented thereto which provided a rigid support for the exposed central portion and which served to protect the disk against damage during shipment.

When such disks are formed of the dimensions required to withstand high pressures it has often been found that the bursting pressure varies considerably from that intended. This is believed to be due in part to the increase in the thickness of the frangible disk that is necessary to enable it to withstand the high pressures and in part to the cement layer between the disk and stiffening ring on the pressure side of the disk. The thickenening of the disk reduces the tendency of the disk to break into small fragments when ruptured and softening of the cement layer at high temperatures may result in gas leakage and cause a change in the flexing characteristics of the disk when the disk is subjected to high fluid pressure.

The disk of the present invention is formed from baked carbon or baked carbon graphite and is machined to provide a flat outer face and an inner pressure receiving face that is provided with a central circular recess with a flat bottom that lies in a plane parallel to that of the outer face of the disk. The disk so formed has a thick, rigid margin and a circular relatively thin central pressure sensitive diaphragm that is integral with the thick margin. A separate carbon back up ring of the same external diameter as the disk and of an internal diameter greater than that of the thin frangible portion of the disk is cemented to the flat exterior face of the disk. By forming the frangible portion of the disk integral with its rigid periphery, stresses created in the diaphragm by fluid pressures are concentrated at the periphery of the inner face recess, so that the disk has a tendency to fracture throughout the circumference of the diaphragm at the juncture of the diaphragm with the thick marginal stiffening rim. The outer back up ring is of an internal diameter sufficiently greater than that of the recess to avoid interference with the peripheral fracture which is at an inclination to the plane of the top face of the disk, so that the thin portion of the disk is blown out bodily when subjected to the predetermined burst pressure, being broken from the rigid rim portion along a peripheral fracture zone that is substantially conical.

Reference should be had to the accompanying drawings forming a part of this specification, in which.

Figure 1:
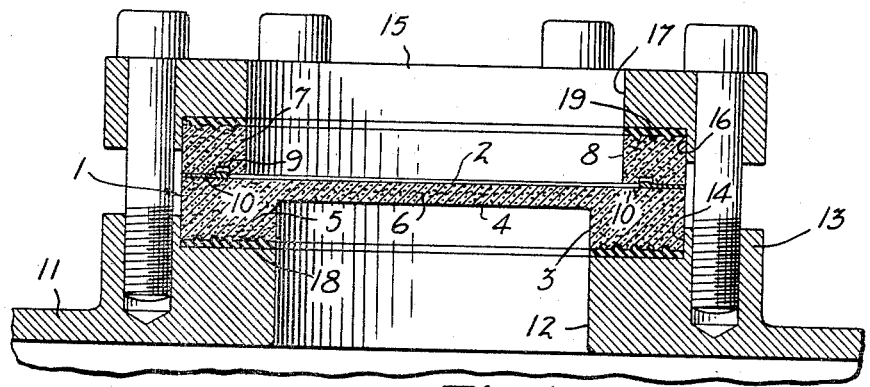
Figure 1 is a sectional view showing the rupture disk of the present invention mounted in a tank outlet opening.
Figure 2:
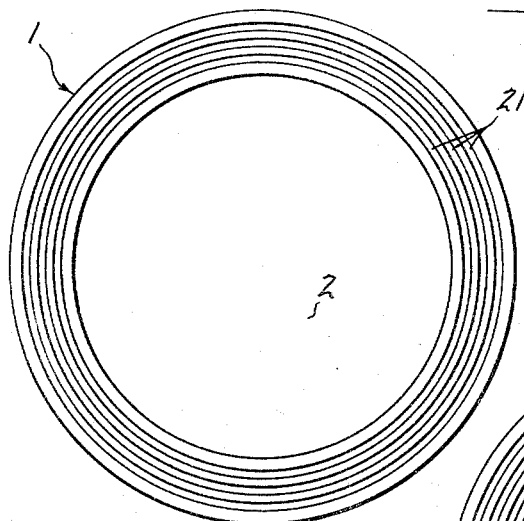
Fig. 2 is a top plan view of the rupture disk.

Referring to the accompanying drawings, the rupture disk of the present invention comprises a body portion 1 of molded carbon or carbon graphite which is machined to provide a smooth, flat top or outer face 2 and a circular recess 3 in its inner face that has a smooth flat bottom 4 lying in a plane parallel to that of the face 2. The inner or pressure receiving side of the disk has an integral stiff, annular margin or rim portion 5 that is of a width and depth to provide a rigid support for the thin central pressure sensitive diaphragm portion 6 that lies between the faces 2 and 4.

To further reinforce and stiffen the peripheral margin of the disk an outer back up ring 7 is provided. The external diameter of the outer ring 7 is the same as that of the stiffening rim 5 and it has an internal face 8 that if of a diameter substantially greater than the internal diameter of the rim portion 5. The ring 7 stiffens the peripheral portion of the disk so that all flexing due to fluid pressure is confined to the diaphragm 6. Because of the fact that even a light scratch on the surface of the diaphragm 6 may cause cracking at a pressure below the desired burst pressure, the back up ring 7 is formed of baked carbon and is permanently secured by cementing to the body 1 of the disk in order to protect the diaphragm 6 during handling and shipment. The bottom face of the ring 7 may be provided with an annular groove 9 in which a portion of the layer 10 of cement joining the ring 7 to the disk body 1 may flow when the ring 7 is pressed against the layer of cement on the disk 1.

As shown in Fig. 1, the rupture disk may be mounted in a tank wall 11 provided with an opening 12 that is surrounded by a boss 13 provided with a recessed seat 14 of a diameter to receive the rupture disk. The stiff margin of the disk is clamped between the boss 13 and a clamping ring 15 which has a recessed seat 16 to receive the back up ring 7. The ring 15 has an opening 17 that registers with the opening of the back up ring 7 and sealing gaskets in the form of washers 18 and 19 of rubber, fibre or other suitable sealing material are interposed between the seats 14 and 16 and the rim 5 and back up ring 7.

In order to provide a more effective seal and to prevent slip between the rupture disk and the gaskets, the bottom face of the rim 5 may be provided with concentric annular grooves 20 and the top face of the back up ring 7 may be provided with similar annular grooves 21.

In the manufacture of carbon disks 1, carbon flour is wetted with pitch or other resinous binder by extensive mixing. The mixture is formed into suitable blocks and baked and the disks are cut from the baked carbon blocks and machined to the required dimensions. The carbon flour may be finely ground graphite, lamp black or coke or any mixture thereof. The baking is at a temperature of at least 1100° F. and may be at temperatures up to 5500° F. when it is desirable to graphitize the material.

Since carbon in the baked stage is generally quite porous, it is necessary to treat the disk body 1 with an impregnating material which plugs the pores of the body at least at the surface thereof, to make the same impervious to gases. The impregnating material should be a material which will withstand the temperatures and chemicals to which the assembly is subjected in service and various natural and synthetic resins may be employed which will plug the pores of the disk. For temperatures below 200° F. polyethylene is a satisfactory filler, since it will resist most chemicals and when melted will readily permeate the molded carbon. For vessels operating above 200° F. the disk may be impregnated with a higher melting point plastic such as Kel-F, a monochlorofluoroethylene polymer, or Heresite, a phenolformaldehyde plastic.

Since the deflection of the disk is slight prior to rupture, the resinous filler or coating does not materially affect the frangibility of the disk. The cement securing the supporting ring 7 to the disk body 1 may be a synthetic rubber base or other suitable adhesive.

The rupture disk of the present invention is particularly advantageous when designed to withstand relatively high pressures. When the rupture disk is designed to withstand pressures of 50 p.s.i. or higher, its thickness is such that the tendency of the disk to break into small fragments when ruptured is greatly reduced and uncertainty of the rupture pattern makes it more difficult to determine the exact pressure at which the disk will rupture.

Figure 4:
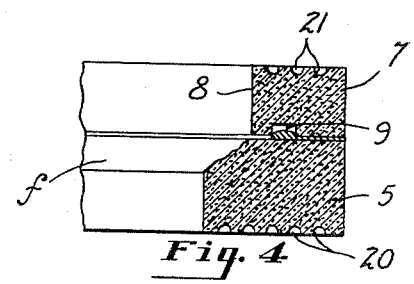
Fig. 4 is a fragmentary sectional view showing the rigid peripheral portion of the disk after the central thin portion of the disk has been broken away from the peripheral portion along a substantially conical fracture zone.
Figure 3:
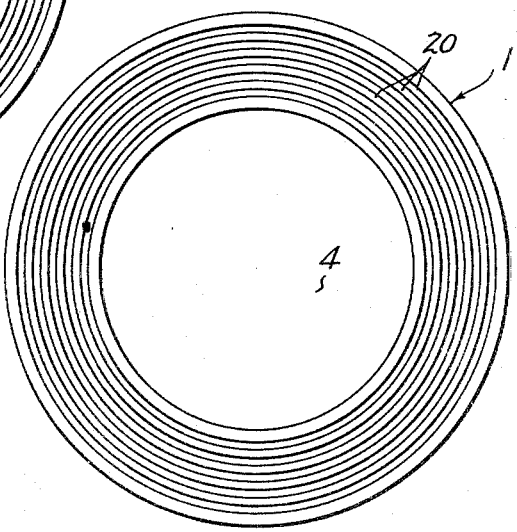
Fig. 3 is a bottom plan view of the rupture disk.

The disk of the present invention is designed to provide rupturing characteristics such that the burst pressure can be accurately predetermined. By forming the thick stiffening rim 5 integral with the diaphragm portion 6 of the disk, the stresses created in the disk by fluid pressures are concentrated at the periphery of the diaphragm so that, when the marginal portion of the disk is rigidly held, the diaphragm will break away from the thick marginal portion along its margin. Since the stresses due to fluid pressure acting on the interior of the diaphragm 6 are resisted by the portion of the rim portion 5 to which the diaphragm is integrally joined, the diaphragm breaks away from the rim portion 5 along a fracture zone $f$ that is conical and that flares toward the top face of the disk as shown in Fig. 4. The backing ring 7 is of sufficiently greater internal diameter than the rim portion 5 to permit a free break between the thin diaphragm 6 and the thick marginal rim 5 along the fracture zone $f$ as shown in Fig. 4.

In order to provide disks having a desired rupture point, disks may be cut from one of the molded blocks of a batch and these disks are tested to determine the burst pressure and the natural rupture angle, after which the remainder of the batch of molded blocks may be cut into disks of the proper dimensions for a given burst pressure and a back up ring of the proper internal diameter may be provided. A fairly close approximation of the desired burst pressure may be obtained for batches baked from substantially identical mixes, but for most accurate determination it is desirable to test a sample from each batch to determine the flexing characteristics and the rupture angle for that particular batch.

It is important that the internal diameter of the back up ring 7 be great enough to position this ring entirely outside the peripheral fracture zone, otherwise the back up ring will impede the peripheral rupture and cause cracking of the disk and leakage of gases at pressures below the desired burst pressure.

Figure 5:
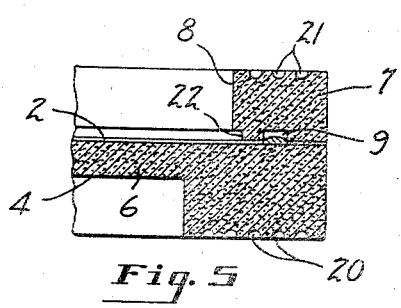
Fig. 5 is a fragmentary sectional view showing a modified form of back up ring.

Since there may be a variation in the angle of break between the pressure sensitive diaphragm and the rigid rim portion of the disk and since the break should be entirely within the backup ring 7, it may be desirable to provide some of the back up rings with a recess 22, as shown in Fig. 5, in the bottom portion of its interior face, so as to avoid interference with the fracture without reducing the radial thickness of the back up ring. Since the break angle or the inclination of the rupture cone to its axis is usually 45° or more, it is usually necessary to provide a back up ring 7 having an internal diameter that exceeds that of the rim portion 5 by an amount at least twice the thickness of the diaphragm 6. The back up ring 7 need not be formed from the same block of baked carbon as the disk body 1 but is preferably formed of similar material.

In order to insure complete separation of the diaphragm 6 from the rim portion 5 of the disk body it is essential that the back up ring 7 be entirely clear of the fracture zone $f$ and that the diaphragm 6 be free from any surface imperfections in order to avoid cracking of the diaphragm at pressures below the calculated burst pressure which would result in a slow leak of fluid rather than the desired sudden release of pressure.

It is to be understood that in accordance with the provisions of the patent statutes, variations and modifications of the specific devices herein shown and described may be made without departing from the spirit of the invention.

What we claim is:

1. A rupture disk formed of baked porous carbon having a thick rim portion, a flat outer face and an inner pressure receiving face with a circular recess within said rim portion that has a flat bottom parallel to said outer face that forms with said outer face a circular pressure sensitive diaphragm integrally joined at its margin to said rim portion, said disk having its pores plugged with a resinous material to render it impervious to gases, and a baked carbon back up ring secured to the marginal portion of said outer face, said back up ring being coaxial with said rim portion and of greater internal diameter to provide a peripheral rupture zone around the margin of said diaphragm that is disposed radially inwardly of the interior of said back up ring and radially outwardly of the interior of said rim portion.

2. A rupture disk according to claim 1 in which the radius of the interior face of the back up ring exceeds the radius of the interior face of said rim portion by an amount at least twice the thickness of the diaphragm portion of the disk.

3. A rupture disk according to claim 1 in which the rim portion of the disk and the back up ring have flat faces provided with concentric annular grooves for engagement with flexible sealing gaskets.

No references cited.